United States Patent [19]

Meyer et al.

[11] Patent Number: 4,706,710

[45] Date of Patent: Nov. 17, 1987

[54] CYLINDER-MOUNTED ROTARY VALVE

[76] Inventors: Vernis H. Meyer, 1805 State St., Granger, Iowa 50109; Francis E. Schlueter, 6666 NW. Fifth St., Des Moines, Iowa 50313

[21] Appl. No.: 864,980

[22] Filed: May 20, 1986

[51] Int. Cl.[4] .......................................... F16K 11/085
[52] U.S. Cl. ................. 137/625.47; 91/445; 91/533
[58] Field of Search ............. 137/625.24, 625.47; 91/445, 533

[56] References Cited

U.S. PATENT DOCUMENTS

| | | | |
|---|---|---|---|
| 1,031,528 | 7/1912 | Cole | 91/533 |
| 1,805,521 | 5/1931 | Hansen | 91/445 X |
| 2,964,908 | 12/1960 | Pomper | 91/445 |
| 3,005,968 | 10/1961 | Jones | 91/533 |
| 4,356,760 | 11/1982 | Bouteille | 91/445 |

Primary Examiner—Robert G. Nilson

[57] ABSTRACT

A cylinder valve includes a body with a threaded extension defining a first output port which screws directly into the cylinder port. An input port connected to a source of hydraulic fluid communicates with the first output port through an axially extending passage in a cylindrical valve spool. The passage also communicates with a second output port axially aligned with the first port and connected through a hose to a second cylinder which operates in unison with the first cylinder. A handle is provided for rotating the spool ninety degrees to block the ports and lock the cylinders against movement. The valve is particularly useful for locking the basket lift cylinders on a cotton harvester in the raised position for maintenance work.

8 Claims, 6 Drawing Figures

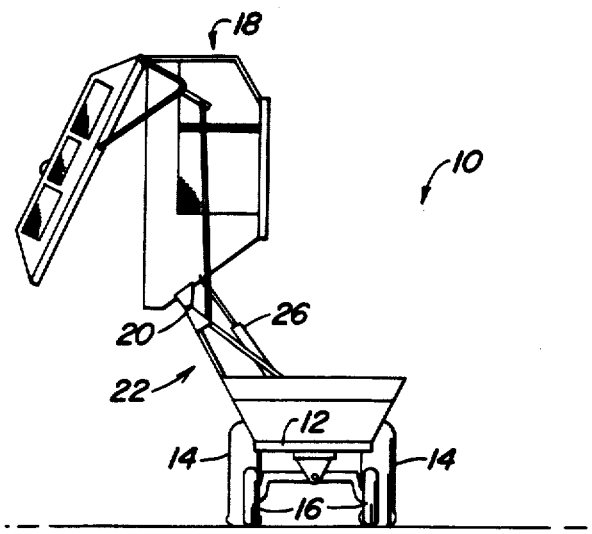
FIG. 1
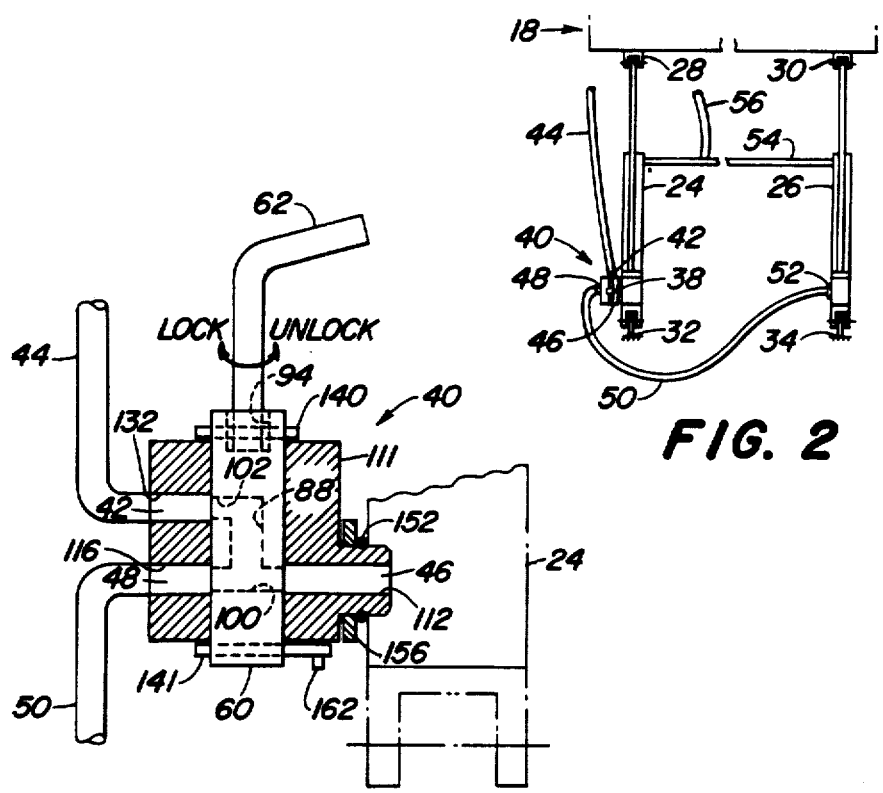
FIG. 2
FIG. 3

CYLINDER-MOUNTED ROTARY VALVE

BACKGROUND OF THE INVENTION

The present invention relates generally to hydraulic systems for agricultural implements, and more specifically, to a valve for reliably locking one or more cylinders in a preselected position.

In some hydraulic systems, such as the lift system for a cotton harvester basket, it is desirable to lock the lift cylinders in a preselected position. For example, when an operator wishes to service a cotton harvester, the basket may be lifted to a raised position and locked in the raised position by clamping a channel or angle to an extended cylinder rod.

OBJECTS OF THE INVENTION

It is an object of the present invention to provide an improved locking structure for maintaining a hydraulic cylinder in a preselected position. It is a further object to provide such a locking structure which is convenient to operate and eliminates channels or other similar hardware.

It is still another object of the present invention to provide a valve for a hydraulic cylinder system which locks a pair of hydraulic cylinders in a preselected extended position. It is a further object to provide such a valve which attaches directly to one of the hydraulic cylinders and is convenient to operate.

It is still another object of the present invention to provide an improved rotary valve for locking a hydraulic cylinder system in a preselected position. It is a further object to provide such a valve which attaches directly to a hydraulic cylinder and which includes a port for connection through a flexible hose to a second hydraulic cylinder.

It is still another object of the present invention to provide a locking structure for conveniently locking the hydraulic lift cylinders for a cotton harvester basket in the raised position.

BRIEF DESCRIPTION OF THE INVENTION

In accordance with the above objects, a rotary valve is connected to the cylinder end of one of a pair of hydraulic lift cylinders connected in parallel. The valve body includes a port connected directly to the hydraulic cylinder port. An output port on the valve body is connected through a conduit to the port of the second hydraulic cylinder. A third port on the valve is connected to a source of hydraulic fluid. A cylindrical spool extends through the valve body and is rotatable ninety degrees between an open position wherein the source is connected directly to the hydraulic cylinder ports, and a closed position wherein each of the ports is isolated from the other ports so that fluid is trapped in the cylinders to prevent movement of the cylinder rods. In the embodiment shown, the rotary valve is connected to the front cylinder of a pair of basket lift cylinders on a cotton harvester. The operator may secure the basket in a raised position by rotating the valve spool from the open position to the closed position, thereby preventing fluid in either of the cylinders from escaping back to the source. The rotary valve is relatively simple in construction and yet is very reliable. By connecting the valve directly to one of the cylinders, the basket or other operated device can be securely held even if a hydraulic line is opened inadvertently.

These and other objects, features and advantages of the present invention will become apparent to one skilled in the art upon reading the following detailed description in view of the drawings.

BRIEF DESCRIPTION OF THE DRAWINGS

FIG. 1 is a rear view of a portion of a cotton harvester having a hydraulically operated basket lift system.

FIG. 2 is a schematic representation of the basket lift system of FIG. 1 generally showing the hydraulic circuit with the rotary valve of the present invention attached to one of the cylinders.

FIG. 3 is an schematic representation of the rotary valve utilized in FIG. 2 and showing the valve in the open position.

DESCRIPTION OF THE PREFERRED EMBODIMENT

Figure 5:
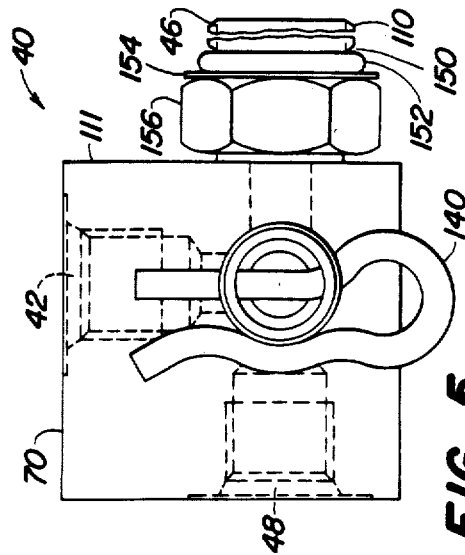
FIG. 5 is a front view of the rotary valve.

Referring now to FIG. 1, there is shown a cotton harvester 10 having a main frame 12 supported for forward movement over the ground by forward drive wheels 14 and rear steerable wheels 16. A dumpable cotton basket 18 is connected for rocking about a fore-and-aft extending pivot 20 by mast structure 22 connected toward one side of the main frame 12. A pair of generally identical double acting hydraulic cylinders 24 and 26 (FIG. 2) include rod ends connected by brackets 28 and 30, respectively, to the basket 18. The cylinder ends of the cylinders 24 and 26 are pivotally connected to the main frame 12 by brackets 32 and 34. The cylinder 24 includes a cylinder end port 38, and a valve assembly 40 is connected directly to the port 38. The valve assembly 40 includes an input port 42 connected to a 'supply hose 44. The supply hose 44 is connected through a conventional operator valve (not shown) to a source of hydraulic fluid on the harvester 10. The valve assembly 40 also includes a first output port 46 which is threaded directly into the-cylinder port 38. A second output port 48 is connected through a length of hose 50 to a cylinder end port 52 on the second cylinder 26. Preferable the cylinders 24 and 26 are connected in parallel with each other with the rod ends in communication with each other through a hose 54 which in turn is connected through a hose 56 to the operator control valve and source of hydraulic fluid on the harvester 10.

The valve assembly 40 includes a cylindrical spool 60 having an operator handle 62 attached thereto for rotating the spool 60 between an open position (FIG. 3) wherein the input port 42 and the output ports 46 and 48 freely communicate with each other to permit the cylinders 24 and 26 to operate in the conventional parallel manner, and a closed position (FIG. 6) wherein each of the ports 42, 46 and 48 are completely closed off. Therefore when the valve assembly 40 is in the closed position, fluid is trapped in the cylinder ends of the cylinders 24 and 26 to prevent the rod ends from moving so that the basket 18 is held in a preselected position.

Figure 6:
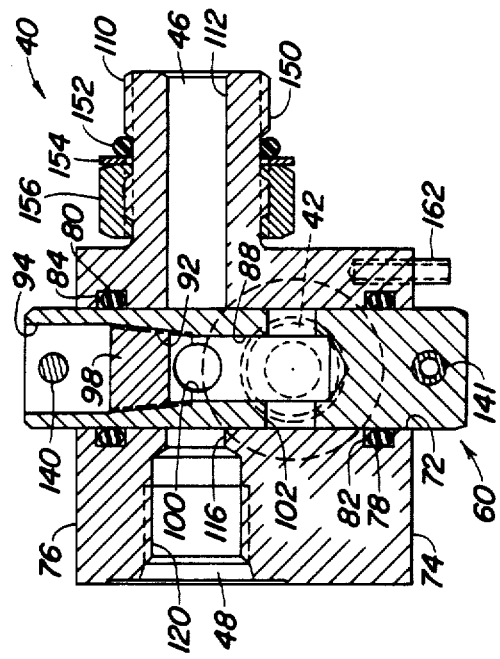
FIG. 6 is a sectional view of the rotary valve of FIGS. 4 and 5.
Figure 4:
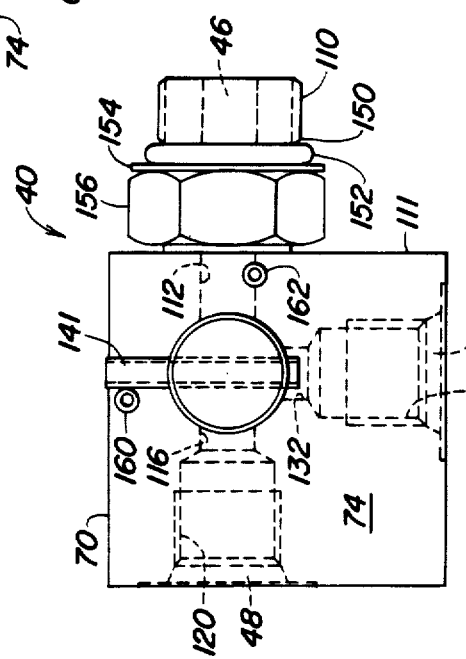
FIG. 4 is a rear view of the rotary valve.

Referring now to FIGS. 4–6 for a more detailed description of the valve assembly 40, the assembly includes a body 70 which is generally cubical in shape and includes a cylindrical bore 72 extending through between opposed faces 74 and 76. O-ring seals 78 and 80 are supported in annular grooves 82 and 84, respectively, adjacent the ends of the bore 72.

The cylindrical spool 60 is rotatably supported within the cylindrical bore 72. The spool 60 includes a cylindrical passage 88 extending axially through its central portion. The passage 88 is connected to a tapered portion 92 Which in turn leads to a cylindrical bore 94 extending outwardly through the end of the spool 60. A tapered plug 98 seals the cylindrical passage 88 from the cylindrical bore 94. A bore 100 extends through the cylindrical spool 60 adjacent the plug 98 and is in communication with the cylindrical passage 88. A second cylindrical bore 102 is axially offset inwardly from the first bore 100 and extends through the central portion of the spool 60. The axis of the bore 102 is offset ninety degrees from the axis of the bore 100.

A threaded extension 110 extends outwardly from face 111 of the valve body 70. The threaded extension 110 includes a cylindrical bore 112 which defines the output port 46. The bore 112 extends through to the cylindrical bore 72 of the body 70 at a right angle to the cylindrical bore 72. A cylindrical bore 116 axially aligned with the bore 112 on the diametrically opposed side of the bore 72 communicates with the port 48. The port 48 includes an internally threaded portion 120 adapted to receive a conventional hose coupler (not shown) located on the end of the hose 50 leading to the rear cylinder 26. When the handle 62 (FIG. 3) is turned to the opened position, the axes of the bores 100, 112, and 116 aligned and so that the ports 46 and 48 and the cylindrical passage 88 are in open fluid communication with each other and with the input port 42 through the bore 102 and the cylindrical passage 88.

The input port 42 includes a threaded portion 130 for receiving a hose coupler (not shown) located on the supply hose 44. A cylindrical bore 132 extends through to the valve body bore 72 at a location offset ninety degrees from the axes of the bores 116 and 112. When the spool 60 is in the open position (FIG. 3) the bore 132 aligns with the bore 102 to provide fluid communication between the input port 42 and the output ports 46 and 48 through the cylindrical passage 88. By rotating the cylindrical spool 60 ninety degrees from the open position, the bores 112, 116 and 132 are sealed off by the spool to prevent any fluid flow to or from the supply line 44 and the cylinder ports 38 and 52 of the cylinders 24 and 26.

A pin 140 is inserted through a pair of holes in the cylindrical spool 60 and through a hole in the end of the control handle 62 which extends into the bore 94. A second pin 141 extends through a hole at the opposite end of the spool 60, and with the first pin 140, prevents the spool 60 from sliding axially out of the bore 72 of the body 70.

The threaded extension 110 screws directly into the port 38 of the cylinder 24. An annular groove or recess 150 extends between sets of threads axially inwardly of the end of the threaded extension 110. An 0-ring 152 is seated in the annular recess 150, and a washer 154 bears against the axially inwardmost portion of the 0-ring. A nut 156 is threaded onto the inwardmost section of the threaded end 110 and bears against the washer 154 to urge the seal 152 into sealing relationship with the body of the cylinder 24. The above-described construction permits the valve assembly 40 to be connected directly to the cylinder 24 to eliminate interconnecting hoses and permit locking of cylinder 24 immediately at the barrel-end of the cylinder.

Stop pins 160 and 162 (FIGS. 4 and 6) are threaded into the body 70 and extend outwardly from the face 74. The pin 141 extends radially outwardly from the spool 60 adjacent the face 74, and the stop pins 160 and 162 limit rotation of the spool 60 to approximately ninety degrees between the open position (FIG. 3) and the closed position (FIG. 6).

In operation, the cylinder assembly 40 is normally operated in the open position (FIG. 3) with the pin 141 rotated against the stop pin 162. The cylinders 24 and 26 are then operable in parallel through the valve assembly 40. During operation of the harvester 10 in the field, the cylinders 24 and 26 are fully retracted so that the basket 18 is in its downwardmost position. To rock the basket 18 upwardly, fluid is supplied under pressure to the line 44 and through the valve assembly 40 to extend the cylinders 24 and 26 in unison. The fluid on the rod-end of the cylinders passes through the lines 54 and 56 to the return side of the hydraulic fluid supply. With the valve assembly 40 in the opened position, the cylinders 24 and 26 may also be retracted in the normal manner to lower the basket from the position shown in FIG. 1 to a lower position. After the basket is raised and the operator desires to lock the basket in the upwardmost position, he rotates the handle 62 ninety degrees from the unlocked position until the pin 141 stops against the stop pin 160 (FIG. 6). The spool 60 then blocks the ports 42, 46, and 48 (FIG. 6) so that no fluid can flow through the cylinder port 38 of the cylinder 24 or through the port 52 of the cylinder 26, thereby locking the cylinders in the extended position. Since the input port 42 is also blocked by the cylinder spool, there is no flow to or from the valve assembly 40 via the line 44. When the operator desires to unlock the cylinders, he rotates the handle 62 to the open position (FIG. 3) so that the ports 42, 46, and 48 are in full fluid communication with each other to permit the cylinders 24 and 26 to again operate in the normal parallel fashion.

Having described the preferred embodiment, it will be apparent that modifications can be made without departing from the scope of the invention as defined in the accompanying claims.

We claim:

1. For an implement with a hydraulic lift cylinder having a cylinder port for receiving fluid under pressure from a source to operate the cylinder, a rotary valve comprising:

a valve body having an input port and an output port and a bore;

a spool rotatably mounted in the bore and including a passage;

means for rotating the spool between open and closed positions, wherein in the open position the input and output ports are in fluid communication with each other through the passage, and in the closed position the input and output ports are closed to fluid communication with respect to each other;

wherein the valve body includes means adapted for directly connecting the output port to the lift cylinder port; and wherein the valve body includes a second output port, means for connecting the second output port to the input port of a second hydraulic lift cylinder for operating the lift cylinders in parallel when the spool is rotated to the open position, and means for blocking the first and second output ports from communication with each other and with the source when the spool is in the closed position.

2. The invention as set forth in claim 1 wherein the spool and the bore are cylindrical and the two output ports are located on opposite sides of the cylindrical spool and the passage includes a diametrical bore axially aligned with the output ports when the spool is in the open position.

3. The invention as set forth i claim 2 wherein the spool includes an axially extending bore in fluid communication with the diametrical bore, and a second diametrical bore in fluid communication with the first-mentioned diametrical bore, said second diametrical bore axially aligned with the input port when the spool is in the open position, and wherein the spool seals the three ports against fluid communication when the spool is in the closed position.

4. For a cotton harvester with a basket and a hydraulic basket lift system having a pair of hydraulic cylinders connected for operation in unison, each cylinder including a port for receiving fluid under pressure from a source to operate the cylinder, a rotary valve comprising:
 a valve body having an input port, first and second output ports, and a cylindrical bore, said first output port including extension means adapted for direct connection to one of the cylinder ports;
 conduit means for connecting the second port to the other one of the cylinder ports;
 means for connecting the input port to the source of fluid under pressure;
 a cylindrical spool rotatably mounted in the bore and including a passage; and
 means for rotating the spool between open and closed positions, wherein in the open position the input port and output ports are in fluid communication with each other through the passage so that the cylinders are operable in unison, and in the closed position the input port and output ports are closed to fluid communication with respect to each other to lock the cylinders against movement and hold the basket in a preselected position 5. The invention as set forth in claim 4 wherein the output ports are located on opposite sides of the cylindrical spool and the passage includes a diametrical bore axially aligned with the output ports when the spool is in the open position.

6. The invention as set forth in claim 5 wherein the spool includes an axially extending bore in fluid communication with the diametrical bore, and a second diametrical bore in fluid communication with the first mentioned diametrical bore, said second diametrical bore axially aligned with the input port when the spool is in the open position, and wherein the spool seals th e three ports against fluid communication when the spool is in the closed position.

7. The invention as set forth in claim 4 wherein the extension means is threaded and screws into said one of the cylinder ports.

8. The invention as set forth in claim 7 including an O-ring seal located on the extension means and nut means threaded onto the extension means for urging the O-ring into sealing relationship with the cylinder.

* * * * *

UNITED STATES PATENT AND TRADEMARK OFFICE
CERTIFICATE OF CORRECTION

PATENT NO. : 4,706,710

DATED : 17 November 1987

INVENTOR(S) : Vernis H. Meyer et al

It is certified that error appears in the above-identified patent and that said Letters Patent is hereby corrected as shown below:

Column 5, claim 3, line 1, change "i" to -- in --.

Signed and Sealed this

Twenty-eighth Day of June, 1988

Attest:

DONALD J. QUIGG

Attesting Officer

Commissioner of Patents and Trademarks